(12) United States Patent
Hashimoto

(10) Patent No.: US 7,911,499 B2
(45) Date of Patent: Mar. 22, 2011

(54) DIGITAL CAMERA

(75) Inventor: Tetsuya Hashimoto, Inzai (JP)

(73) Assignee: Ricoh Company, Ltd., Tokyo (JP)

(*) Notice: Subject to any disclaimer, the term of this patent is extended or adjusted under 35 U.S.C. 154(b) by 696 days.

(21) Appl. No.: 11/919,675

(22) PCT Filed: Feb. 8, 2007

(86) PCT No.: PCT/JP2007/052662
§ 371 (c)(1),
(2), (4) Date: Oct. 31, 2007

(87) PCT Pub. No.: WO2007/091728
PCT Pub. Date: Aug. 16, 2007

(65) Prior Publication Data
US 2010/0149345 A1    Jun. 17, 2010

(30) Foreign Application Priority Data
Feb. 9, 2006    (JP) .................................. 2006-032061

(51) Int. Cl.
*H04N 5/225* (2006.01)

(52) U.S. Cl. .............. 348/207.1; 348/211.8; 348/333.01

(58) Field of Classification Search ............. 348/207.99, 348/207.11, 207.1, 211.1–211.14, 333.01–333.05
See application file for complete search history.

(56) References Cited

U.S. PATENT DOCUMENTS

| | | | |
|---|---|---|---|
| 5,815,201 A | 9/1998 | Hashimoto et al. | |
| 5,815,205 A | 9/1998 | Hashimoto et al. | |
| 5,870,084 A | 2/1999 | Kanungo et al. | |
| 6,111,604 A | 8/2000 | Hashimoto et al. | |
| 6,344,875 B1 | 2/2002 | Hashimoto et al. | |
| 6,967,655 B1 | 11/2005 | Goto | |
| 7,046,276 B2 | 5/2006 | Hashimoto et al. | |
| 7,113,218 B2 * | 9/2006 | Battles et al. | 348/373 |
| 2004/0160623 A1 | 8/2004 | Strittmatter et al. | |
| 2004/0201774 A1 * | 10/2004 | Gennetten | 348/375 |
| 2005/0073521 A1 | 4/2005 | Watanabe et al. | |
| 2005/0083411 A1 * | 4/2005 | Cozier et al. | 348/211.1 |
| 2005/0111036 A1 | 5/2005 | Takasaki et al. | |
| 2006/0023069 A1 * | 2/2006 | Saito | 348/207.99 |

(Continued)

FOREIGN PATENT DOCUMENTS

JP     06-253207     9/1994

(Continued)

*Primary Examiner* — Tuan Ho
(74) *Attorney, Agent, or Firm* — Dickstein Shapiro LLP

(57) ABSTRACT

A sample analyzing apparatus includes: an irradiation system which irradiates a charged particle onto a sample having a concave portion partially on a surface thereof; a light condensing reflecting mirror which condenses luminescence obtained from the surface based on the irradiation of the charged particle; a light detector which detects the luminescence guided to the light condensing reflecting mirror; a charged particle detector which detects the charged particle reflected from the surface of the sample as a reflection charged particle; and a signal processor which controls the irradiation system to irradiate the charged particle intermittently, which obtains a shape of the sample on the basis of a detection signal outputted from the charged particle detector, and which identifies a material of the sample on the basis of an attenuation characteristic of a detection signal outputted from the light detector in a period from a time point in which the intermittent irradiation of the charged particle by the irradiation system is ended to a time point in which the intermittent irradiation of the charged particle by the irradiation system is started.

4 Claims, 13 Drawing Sheets

U.S. PATENT DOCUMENTS

| | | |
|---|---|---|
| 2006/0132616 A1 | 6/2006 | Tanaka et al. |
| 2006/0158528 A1 | 7/2006 | Hashimoto et al. |

FOREIGN PATENT DOCUMENTS

| | | |
|---|---|---|
| JP | 07-222097 | 8/1995 |
| JP | 08-237526 | 9/1996 |
| JP | 08-298614 | 11/1996 |
| JP | 09-130649 | 5/1997 |
| JP | 3315201 | 7/2002 |
| JP | 2003-060959 | 2/2003 |
| JP | 2003-199020 | 7/2003 |
| JP | 2003-316892 | 11/2003 |
| JP | 2003-348443 | 12/2003 |
| JP | 2004-064675 | 2/2004 |
| JP | 2004-159281 | 6/2004 |
| JP | 2004-227351 A | 8/2004 |
| JP | 3583889 | 8/2004 |
| JP | 2004-246876 | 9/2004 |
| JP | 2004-350146 | 12/2004 |
| JP | 3643614 | 2/2005 |
| JP | 2005-086263 | 3/2005 |
| JP | 2005-159396 | 6/2005 |
| JP | 3793204 | 4/2006 |
| JP | 2006-203625 | 8/2006 |
| JP | 2006-253741 | 9/2006 |
| JP | 2006-319497 | 11/2006 |
| JP | 2006-319835 | 11/2006 |
| JP | 2007-049271 | 2/2007 |
| WO | WO 03/094545 A1 | 11/2003 |
| WO | WO 2005/101745 A1 | 10/2005 |

\* cited by examiner

FIG. 5A

CONTENTS OF INQUIRY RESULT

| BD_ADDR (ADDRESS UNIQUE TO BLUETOOTH DEVICE) | DEVICE CLASS (PC, PDA, PORTABLE PHONE, PRINTER, ETC.) | | |
|---|---|---|---|

FIG. 5B

CONTENTS OF REMOTE NAME REQUEST COMPLETE

| NAME OF BLUETOOTH DEVICE | | |
|---|---|---|

FIG. 5C

CONTENTS OF SERVICE SEARCH RESPONSE

| CORRESPONDING SERVICE (BIP, DUN) | | |
|---|---|---|

CONTENTS OF GET RESPONSE: SUCCESS

| DPOF SUPPORT (1, 0) | SUPPORTING ENCODE TYPE (JPEG, GIF, PNG) | ACCEPTING MAXIMUM FILE SIZE | MULTI-PRINTING SUPPORT (1, 0) | INDEX-PRINTING SUPPORT (1, 0) |
|---|---|---|---|---|

| DEVICE KIND | PRINTER OR TV OR PC |
|---|---|
| DEVICE NAME CHARACTER CODE TYPE | US-ASCII OR SHIFT_JIS OR GB2312 |
| DEVICE NAME CHARACTER CODE | CHARACTER STRING OF NAME OF DEVICE IN ABOVE CHARACTER CODE TYPE<br><br>(EXAMPLE) A CASE OF US-ASCII "PRINTER CX8000"<br><br>A CASE OF SHIFT_JIS "プリンタCX8000" |
| | |

FIG. 17

PARTNER DEVICE: PRINTER

| DEVICE KIND | PRINTER |
|---|---|
| DEVICE NAME CHARACTER CODE TYPE | SHIFT_JIS |
| DEVICE NAME CHARACTER CODE | プリンタCX8000 |
| | |

PARTNER DEVICE: PC

| DEVICE KIND | PC |
|---|---|
| DEVICE NAME CHARACTER CODE TYPE | SHIFT_JIS |
| DEVICE NAME CHARACTER CODE | ＰＣ保存用 |
| | |

FIG. 18

SELECT DESTINATION

1．プリンタCX8000
　　2．ＰＣ保存用

PERIPHERAL DEVICE SEARCH: DISPLAY
MENU: CANCEL　　　　DETERMINE: OK

FIG. 19

| DEVICE KIND | PRINTER OR TV OR PC |
|---|---|
| DEVICE NAME CHARACTER CODE TYPE 1 | US-ASCII OR SHIFT_JIS OR GB2312 |
| DEVICE NAME CHARACTER CODE 1 | CHARACTER STRING OF NAME OF DEVICE IN ABOVE CHARACTER CODE TYPE<br>(EXAMPLE) A CASE OF US-ASCII "PRINTER CX8000"<br>A CASE OF SHIFT_JIS "プリンタCX8000" |
| DEVICE NAME CHARACTER CODE TYPE 2 | US-ASCII OR SHIFT_JIS OR GB2312 |
| DEVICE NAME CHARACTER CODE 2 | CHARACTER STRING OF NAME OF DEVICE IN ABOVE CHARACTER CODE TYPE<br>(EXAMPLE) A CASE OF US-ASCII "PRINTER CX8000"<br>A CASE OF SHIFT_JIS "プリンタCX8000" |

FIG. 20

| DEVICE KIND | PRINTER |
|---|---|
| DEVICE NAME CHARACTER CODE TYPE 1 | US-ASCII |
| DEVICE NAME CHARACTER CODE 1 | PRINTER CX8000 |
| DEVICE NAME CHARACTER CODE TYPE 2 | SHIFT_JIS |
| DEVICE NAME CHARACTER CODE 2 | プリンタCX8000 |

DIGITAL CAMERA

TECHNICAL FIELD

The present invention relates to a digital camera. In particular, the invention relates to a digital camera configured to establish communication with a peripheral device(s) which has at least a wireless transmission function.

BACKGROUND ART

Recently, digital cameras which photographs a photographic subject and converts a photographed image of the photographic subject into digital image data by a simple manipulation have been widely prevalent. When the image photographed with such a digital camera is printed in a form of photograph, the digital image data is usually once taken into a computer, then the image data is processed with the computer, and the thus processed image data is output to a color printer connected with the computer to perform printing.

In addition, a print system in which printing is performed by transmitting the digital image data from the digital camera to the color printer without intervening the computer, as well as a so-called photo-direct printing method in which printing is performed without the intervention of the computer by storing the digital image data in a memory card mounted in the digital camera and loading the memory card into the color printer thereafter, are also in widespread use in recent years.

Conventionally, there have been proposed a number of print systems which transmit the digital image data from the digital camera to the peripheral color printer. As one of the proposals, Japanese patent publication No. 2003-060959 is known. JP2003-060959A discloses a digital camera in which peripheral wireless communication devices which can perform communication are searched when electrical power supply of the camera is turned on or when network connection is started, and a list of the wireless communication devices is displayed when the wireless communication devices are found.

DISCLOSURE OF THE INVENTION

However, according to the invention disclosed in JP2003-060959A, there is a drawback that, when the communicatable wireless communication device or "a partner device" is searched in the background, it cannot be grasped when the partner device is found or what is found even when the partner device is searched and found. There is also a problem that, when the partner device is searched and name of the found partner device is displayed as a result of the search, only the kind of the partner device is displayed, since the partner device is displayed in accordance with information on the kind of the partner device received, and accordingly, the unique name and so on of the partner device cannot be displayed. Moreover, there is a problem that it is not possible to cope with displaying names of the increased kinds of the partner devices. Further problem is that even when a character string is received from the partner device and displayed, the received character string cannot be displayed if a font corresponding to the received character string is not available.

At least one objective of the present invention is to provide a digital camera in which a result of search of communication partner device(s) is easy to understand and having a good operability in selection of the communication partner device(s).

To achieve these and other advantages and in accordance with the purpose of the invention, as embodied and broadly described herein, the invention provides a digital camera, comprising: an imaging unit configured to image an image of a photographic subject and output the imaged image of the photographic subject as an image data; a recording unit configured to store the image data outputted from the imaging unit as an image file; a communicator configured to establish communication with at least one external device to transmit data with the at least one external device; a display configured to display the image of the photographic subject imaged by the imaging unit and the image data stored in the recording unit as a reproduced image; and a controller configured to search the at least one external device possible to communicate with the communicator by the communicator, and configured to display a guidance information informing a user that the at least one external device is searched and found on the display when the at least one external device is searched and found.

Advantageously, the controller is configured to display the guidance information on the display when an operation in which the guidance information is possible to be displayed on the display is carried out.

Advantageously, the controller is further configured to enable the user to specify the at least one external device to be searched by the communicator.

Advantageously, the controller is further configured to display an icon corresponding to the at least one external device searched and found on the display when the at least one external device is searched and found.

Advantageously, the controller is further configured to display the number of the external device or the external devices searched and found by the communicator on the display.

In addition, to achieve these and other advantages and in accordance with the purpose of the invention, as embodied and broadly described herein, the invention provides a digital camera, comprising: an imaging unit configured to image an image of a photographic subject and output the imaged image of the photographic subject as an image data; a recording unit configured to store the image data outputted from the imaging unit as an image file; a communicator configured to establish communication with at least one external device to transmit data with the at least one external device; a display configured to display the image of the photographic subject imaged by the imaging unit and the image data stored in the recording unit as a reproduced image; and a controller configured to search the at least one external device possible to communicate with the communicator by the communicator, and configured to display the number of the external device or the external devices searched and found by the communicator on the display.

Advantageously, the controller is further configured to display an icon corresponding to the at least one external device searched and found on the display when the at least one external device is searched and found.

Advantageously, the controller is further configured to wait a certain period of time after the at least one external device is searched and found, and starts to search the at least one external device again by the communicator when the certain period of time elapses.

Advantageously, the controller is configured to display the icon on the display when an operation in which the icon is possible to be displayed on the display is carried out.

Advantageously, the controller is further configured to enable a user to specify the at least one external device to be searched by the communicator.

Moreover, to achieve these and other advantages and in accordance with the purpose of the invention, as embodied and broadly described herein, the invention provides a digital camera, comprising: an imaging unit configured to image an image of a photographic subject and output the imaged image of the photographic subject as an image data; a recording unit configured to store the image data outputted from the imaging unit as an image file; a communicator configured to establish communication with at least one external device to transmit data with the at least one external device; a display configured to display the image of the photographic subject imaged by the imaging unit and the image data stored in the recording unit as a reproduced image; and a controller configured to search the at least one external device possible to communicate with the communicator by the communicator, and configured to display a character string corresponding to a character code indicating name of the at least one external device searched and found obtained by the communication with the at least one external device by the communicator on the display, when the at least one external device is searched and found.

Advantageously, the controller is further configured to judge a kind of the character code of the character string obtained by the communication with the at least one external device by the communicator as to whether or not the digital camera supports the kind of the character code obtained, and to display the character string of the character code corresponding to the kind of the character code supported on the display.

Advantageously, the character string obtained by the communication with the at least one external device by the communicator includes a first character string and a second character string, the controller is further configured to judge a first kind of the character code corresponding to the first character string and a second kind of the character code corresponding to the second character string both obtained by the communication with the at least one external device by the communicator as to whether or not the digital camera supports the first kind of the character code and the second kind of the character code obtained, to display the first character string on the display when the corresponding first kind of the character code is supported, and to display the second character string on the display when the corresponding second kind of the character code is supported.

Advantageously, the controller is further configured to display the first character string on the display when both of the corresponding first and the second character strings are supported.

Advantageously, when the digital camera does not support a part of the character string of one of the first character string corresponding to the first kind of the character code and the second character string corresponding to the second kind of the character code, the controller is configured to display the character string of the other of the first character string and the second character string fully supported by the digital camera.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this description. The drawings illustrate embodiments of the invention and, together with the description, serve to explain the principles of the invention.

FIGS. 5A to 5C illustrate the contents of "Inquiry Result", "Remote Name Request Complete" and "Service Search Response" of FIG. 4, respectively.

FIG. 17 illustrates one example of the format of the information of the partner device of FIG. 16.

FIG. 18 illustrates an example of displaying according to the format of the information of the partner device of FIG. 17.

FIG. 19 illustrates another format of the information of the partner device received when the searching of the partner devices is performed according to the preferred embodiment of the present invention.

FIG. 20 illustrates one example of the format of the information of the partner device of FIG. 19.

DESCRIPTION OF NUMERALS

Figure 1A:
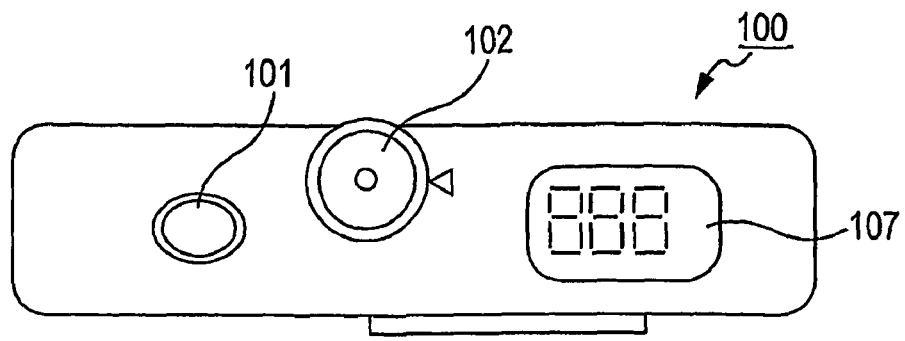
FIGS. 1A to 1C are schematic external views of a digital camera according to an embodiment of the present invention.

1 Partner device (external device)
2 Partner device (external device)
3 Partner device (external device)
100 Digital camera
111 LED monitor
137 ROM
139 CCD
140 F/E-IC
141 Controller
142 SDRAM 143 Card throttle
144 Card
145 Built-in memory
157 Bluetooth circuit
201 Icon
202 Guidance information
203 The number of device(s) found

BEST MODE FOR CARRYING OUT THE INVENTION

Reference will now be made in detail to the present preferred embodiments of the present invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 1B:
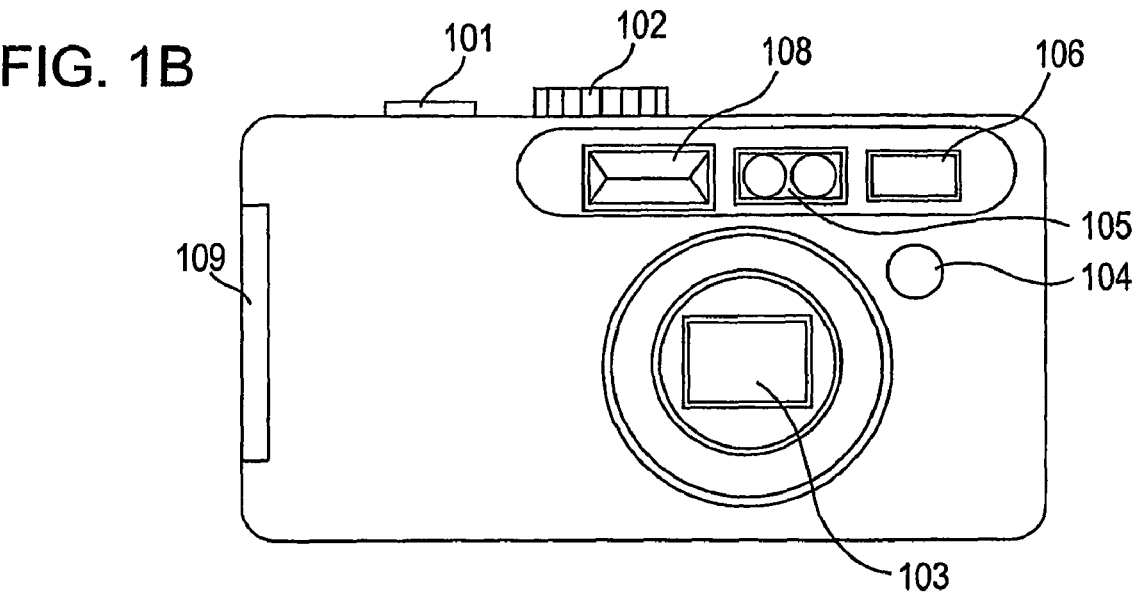
Figure 1C:
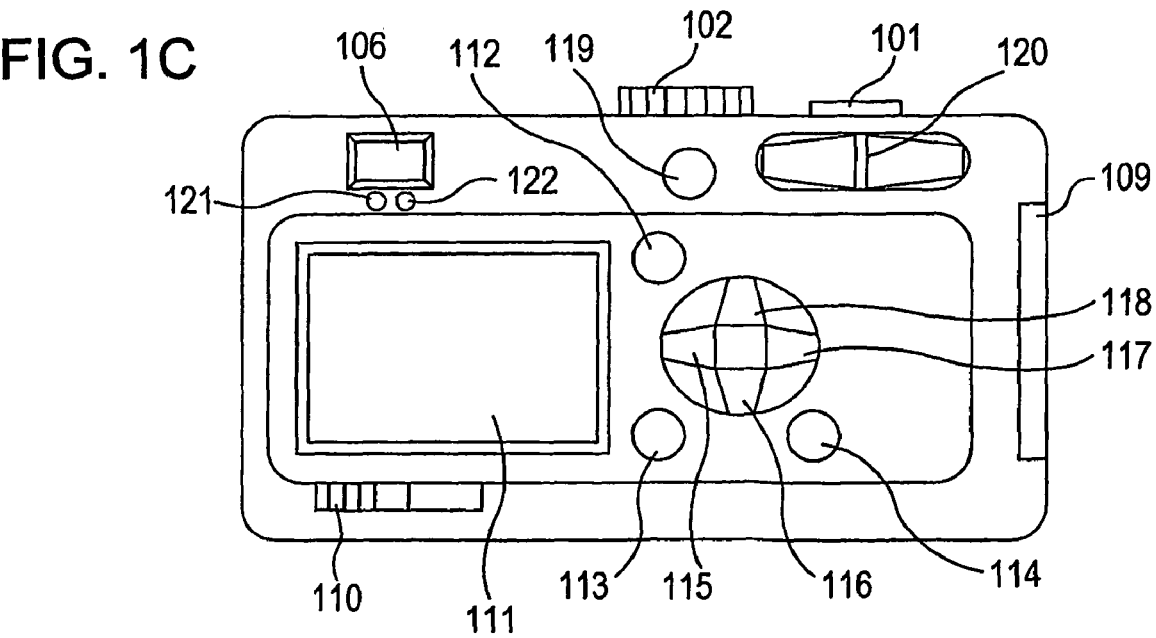

FIGS. 1A to 1C are external views of a digital camera 100 according to an embodiment of the present invention, wherein FIG. 1A is a plan view, FIG. 1B is a front view, and FIG. 1C is a rear view of the digital camera 100. As illustrated by way of example in FIGS. 1A and 1B, an upper surface of a chassis of the digital camera 100 is provided with a release shutter button 101, a mode dial 102, and a sub-LED (Light-Emitting Diode) 107. In addition, as illustrated in FIG. 1B, a front surface of the digital camera 100 is provided with a lens barrel unit 103, a remote control light receiver 104, a ranging unit 105, an optical viewfinder 106, a strobe light emitter 108, and a card/battery lid 109 provided on a side surface of the chassis. Moreover, as illustrated in FIG. 1C, a rear surface of the digital camera 100 is provided with the optical viewfinder 106, a power switch 110, an LCD (Liquid Crystal Display) monitor 111, a MENU switch 112, an OK switch 113, a display switch 114, a left/image confirmation switch 115, a down/macro switch 116, a right switch 117, an up/strobe light switch 118, a self-timer/delete switch 119, a zoom switch 120, an auto-focus LED 121, and a strobe light LED 122.

Figure 2:
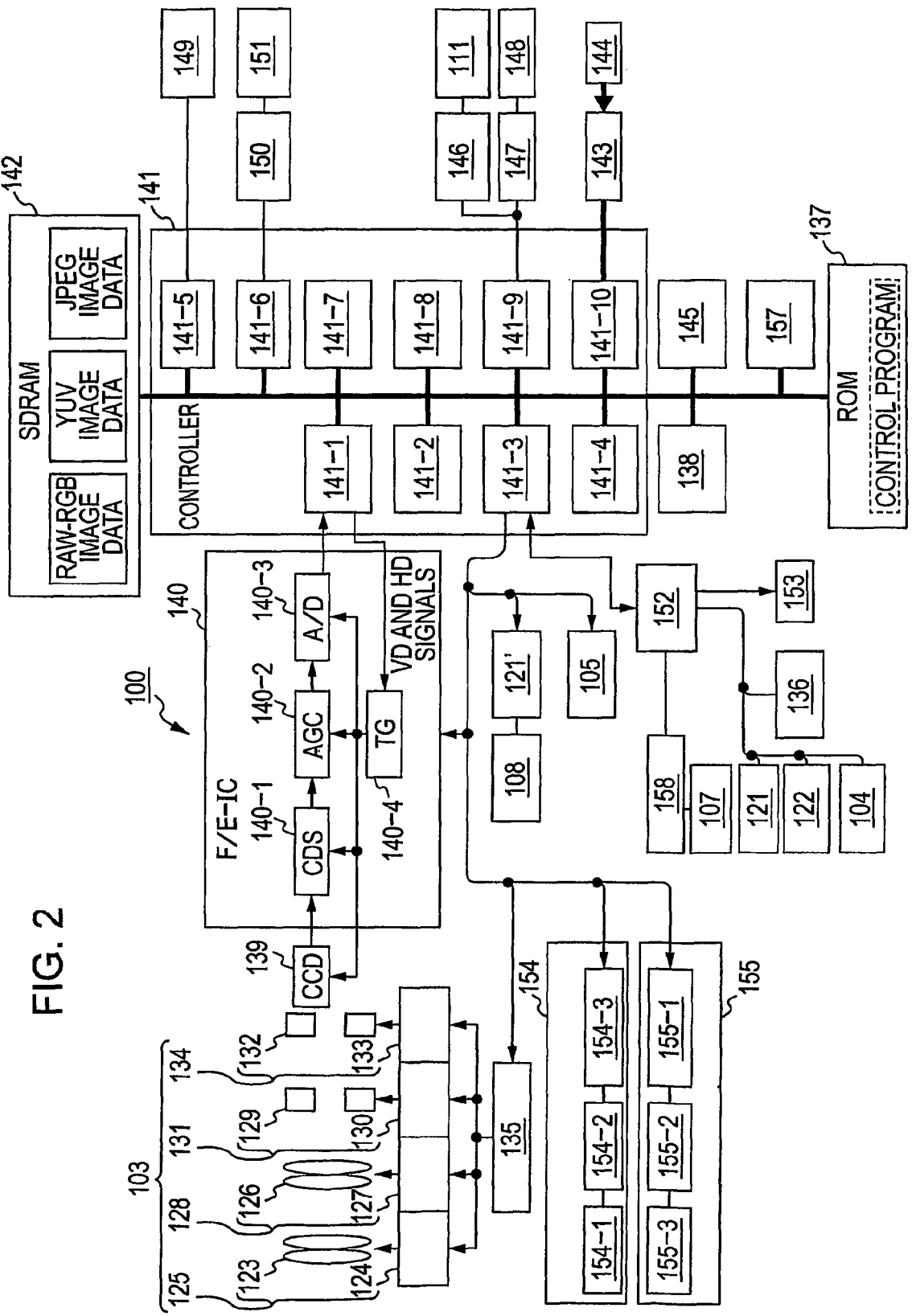
FIG. 2 is a block diagram schematically illustrating a structure of the digital camera according to the embodiment of the present invention.

Referring to FIG. 2 as a block diagram illustrating a structure of the digital camera 100 according to the embodiment of the present invention, the lens barrel unit 103 includes a zoom optical system 125 having a zoom lens 123 and a zoom driving motor 124, for introducing an optical image of a photographic subject.

The lens barrel unit 103 also includes a focus optical system 128, an aperture unit 131, a mechanical shutter unit 134, and a motor driver 135. Wherein, the focus optical system 128 has a focus lens 126 and a focus driving motor 127. The aperture unit 131 has an aperture 129 and an aperture motor 130. The mechanical shutter unit 134 has a mechanical shutter 132 and a mechanical shutter motor 133. The motor driver 135 is structured to drive each of the motors 124, 127, 130 and 133.

The motor driver 135 is driven and controlled according to a driving command outputted from a CPU (Central Processing Unit) block 141-3 included in a controller 141 which will be described later, based on an input, for example, from the remote control light receiver 104 and a manipulation key unit 136.

Control programs and parameters for performing control and so on, which are described in a code decodable by the CPU block 141-3, are stored in a ROM 137. The control programs are loaded into a not-illustrated main memory when power of the digital camera 100 according to the present embodiment is turned to "ON" state.

The CPU block 141-3 controls operation of various parts of the digital camera 100 in accordance with the loaded control programs, and also stores data and so on necessary for performing of the control temporarily into a RAM 138 and a local SRAM 141-4 included in the controller 141 which will be described later. Here, the ordinary skilled artisan in the field will readily notice that the control programs and the control parameters can be changed by using a rewritable flash ROM or the like for the ROM 137, to easily upgrade a version of functions.

The CPU block 141-3 is also connected with the strobe light emitter 108, a strobe circuit 121', and the ranging unit 105. The strobe light emitter 108 emits strobe-light, which is controlled by the strobe circuit 121'. The ranging unit 105 carries out ranging from the digital camera to the photographic subject.

A CCD (Charge-Coupled Device) 139 is a solid-state image pick-up device for photo-electrically converting the optical image of the photographic subject. An F/E (Front/End)-IC 140 includes a CDS (Correlated Double Sampling) portion 140-1, an AGC (Automatic Gain Control) portion 140-2, an A/D (Analog/Digital) converter 140-3, and a TG (Timing Generator) 140-4. Wherein, the CDS portion 140-1 performs correlated double sampling for image noise removal, the AGC portion 140-2 carries out gain control, and the A/D portion 140-3 carries out digital signal conversion. The TG 140-4 is supplied with a vertical synchronizing signal (hereinafter simply referred to as VD) and a horizontal synchronizing signal (hereinafter simply referred to as HD) from a CCD1 signal processing block 141-1, and is controlled by the CPU block 141-3 so as to generate a drive-timing signal for the CCD 139 and the F/E-IC 140.

The controller 141 includes the CCD1 signal processing block 140-1 which performs white balance setting, gamma setting and so on to output data obtained from the CCD 139 and outputted from the F/E-IC 140, and which also supplies the VD signal and the HD signal to the TG 140-4 as mentioned above. The controller 141 also includes a CCD2 signal processing block 140-2 which converts the output data into brilliance data and chrominance difference data by a filtering process.

The controller 141 further includes the above-mentioned CPU block 141-3 for controlling respective portions of the digital camera 100, the local SRAM 141-4 for temporarily storing the data or the like necessary for the control as mentioned above, an USB (Universal Serial Bus) block 141-5, and a serial communication block 141-6. The USB block 141-5 carries out USB communication with an external device such as a personal computer and so on. The serial communication block 141-6 caries out serial communication with the external device such as the personal computer for example.

Moreover, the controller 141 includes a JPEG CODEC (Coder/Decoder) block 141-7, a resize block 141-8, a TV signal display block 141-9, and a memory card controller block 141-10. The JPEG CODEC block 141-7 carries out JPEG compression and decompression. The resize block 141-8 enlarges and reduces a size of photographed image data, for example, by an interpolation process. The TV signal display block 141-9 converts the image data into a video signal so as to display the image data on an external display device such as a liquid crystal monitor, TV and so on. The memory card controller block 141-10 controls a memory card which records the photographed image data or the like.

A SDRAM (Synchronous Dynamic Random Access Memory) 142 temporarily stores the image data at the time when various processes are to be applied to the image data in the controller 141. The image data to be stored therein is loaded from the CCD 139 via the F/E-IC 140 for example. The image data is stored in the SDRAM 142 as "RAW-RGB image data" in a state in which the white balance setting and the gamma setting are performed thereto in the CCD1 signal processing block 141-1, as "YUV image data" in a state in which the brilliance data and chrominance difference data conversion are carried out thereto in the CCD2 signal processing block 141-2, and as "JPEG image data" in which the image data is JPEG-compressed in the JPEG CODEC block 141-7.

A card throttle 143 is a throttle for attaching a card 144 such as a detachable memory card, a LAN (Local Area Network) card, a wireless LAN card, a Bluetooth card, and so on.

A built-in memory 145 is a memory for enabling the photographed image data to be stored therein even when the card 144 is not attached to the above-mentioned card throttle 143.

An LCD (Liquid Crystal Display) driver 146 is a drive circuit for driving the LCD monitor 111 as a display. The LCD driver 146 also has a function of converting the video signal outputted from the TV signal display block 141-9 into a signal for displaying the image data onto the LCD monitor 111. The LCD monitor 111 is a monitor for monitoring a state of the photographic subject before the photographing is carried out, confirming a photographed image, and displaying the image data recorded in the card 144 or in the above-mentioned built-in memory 145, for example.

A video AMP 147 is an amplifier for converting the video signal outputted from the TV signal display block 141-9 into a signal of 75 ohm impedance. A video jack 148 is a jack for connecting the digital camera 100 with the external display device such as TV for example. An USB connector 149 is a connector for carrying out an USB connection with the external device such as the personal computer.

A serial driver circuit 150 is a circuit for performing voltage-conversion of a signal outputted from the aforementioned serial communication block 141-6 so as to carry out the serial communication with the external device such as the personal computer for example. An RS-232C connector 151 is a connector for performing a serial connection with the external device such as the personal computer for example.

A SUB-CPU 152 is a CPU in which a ROM and a RAM are embedded as one-chip. The SUB-CPU 152 outputs signals outputted from the manipulation key unit 136 and the remote control light receiver 104 to the above-mentioned CPU block 141-3 as an operator's manipulation information. The SUB-CPU 152 also converts a state of the digital camera 100 outputted from the aforementioned CPU block 141-3 into control signals for a sub-LED 107, the AF (Auto Focus) LED 121, the strobe light LED 122 and a buzzer 153, and outputs the control signals thereto.

The sub-LED 107 is, for example, a display portion for displaying the number of times that the photographing is possible. A LED driver 156 is a drive circuit for driving the sub-LED 107 according to the signal outputted from the SUB-CPU 152 mentioned above.

The AF LED 121 is a LED for displaying a focusing state at the time of photographing. The strobe light LED 122 is a LED for representing a charging state of a strobe light. In one embodiment of the present invention, the AF LED 121 and the strobe light LED 122 may be used for other display application, such as displaying a state that the memory card or the like is being accessed.

The manipulation key unit 136 is a key circuit for enabling the user to manipulate the digital camera 100. The remote control light receiver 104 is a portion for receiving a signal from a remote control transmitter manipulated by the user.

An audio recording unit 154 includes a microphone 154-1, a microphone AMP 154-2, and an audio recording circuit 154-3. Wherein, the microphone 154-1 enables the user to input sound and voice, the microphone AMP 154-2 amplifies a signal of the sound and voice inputted from the microphone 154-1, and the audio recording circuit 154-3 records the amplified sound and voice signal.

An audio reproducing unit 155 includes an audio reproducing circuit 155-1, an audio AMP 155-2, and a speaker 155-3, wherein the audio reproducing circuit 155-1 converts the recorded sound and voice signal into a signal capable of being outputted by the speaker 155-3, the audio AMP 155-2 amplifies the converted sound and voice signal and drives the speaker 155-3, and the speaker 155-3 outputs the sound and voice signal.

A connection of the digital camera 100 with an external device(s) accepting a Bluetooth connection is performed by a Bluetooth circuit 157. In one embodiment of the invention in which the digital camera 100 includes no Bluetooth circuit 157, a Bluetooth card is inserted into the card throttle 143 so as to be connected with the Bluetooth accepting external device(s). A connection to the Ethernet (Registered Trademark) is performed by a not-illustrated Ethernet connection circuit or a not-illustrated wireless Ethernet connection circuit. The digital camera 100 may be connected to network by attaching the LAN card or the wireless LAN card to the card throttle 143, for example, when the digital camera 100 includes no Ethernet connection circuit in accordance with one embodiment of the invention.

Now, a search process of the digital camera 100 for an external peripheral wireless communication device(s) or "a partner device(s)" according to one embodiment of the invention will be described. In the present embodiment, the peripheral wireless communication device(s) which is possible to perform communication with the digital camera 100 or "the partner device(s)" includes, for example, a personal computer (hereinafter simply referred to as PC), a printer, a PDA (Personal Digital Assistant), and a portable phone, although it is not limited thereto.

Figure 3:
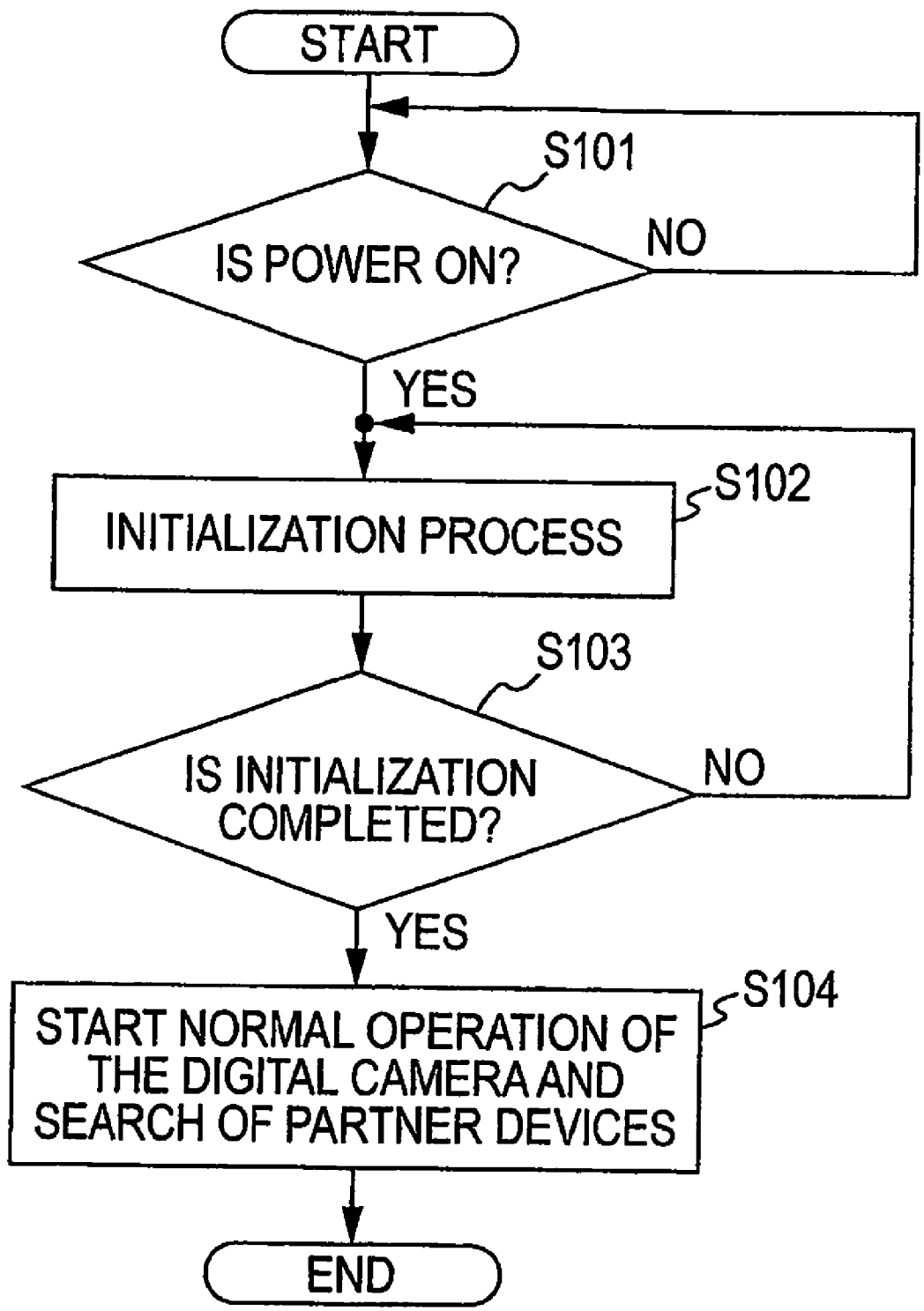
FIG. 3 is a flowchart illustrating processes leading to a search process in the digital camera according to one embodiment of the present invention.

FIG. 3 is a flowchart illustrating processes leading to the search process in the digital camera 100 according to the embodiment of the present invention. Referring to FIG. 3, when the power of the digital camera 100 is turned ON (Step S101: YES), initialization of the digital camera 100 is performed (Step S102). When the initialization completes (Step S103: YES), the search process for the partner device(s) in accordance with a process flow described later starts, and at the same time, operation of the digital camera 100 is carried out (Step S104). Here, the operation of the digital camera 100 is, for example, normal operation of the digital camera 100 such as photographing, reproducing and so on, and the search process of the partner device(s) is preferably carried out in the background of processes of the digital camera 100.

Figure 4:
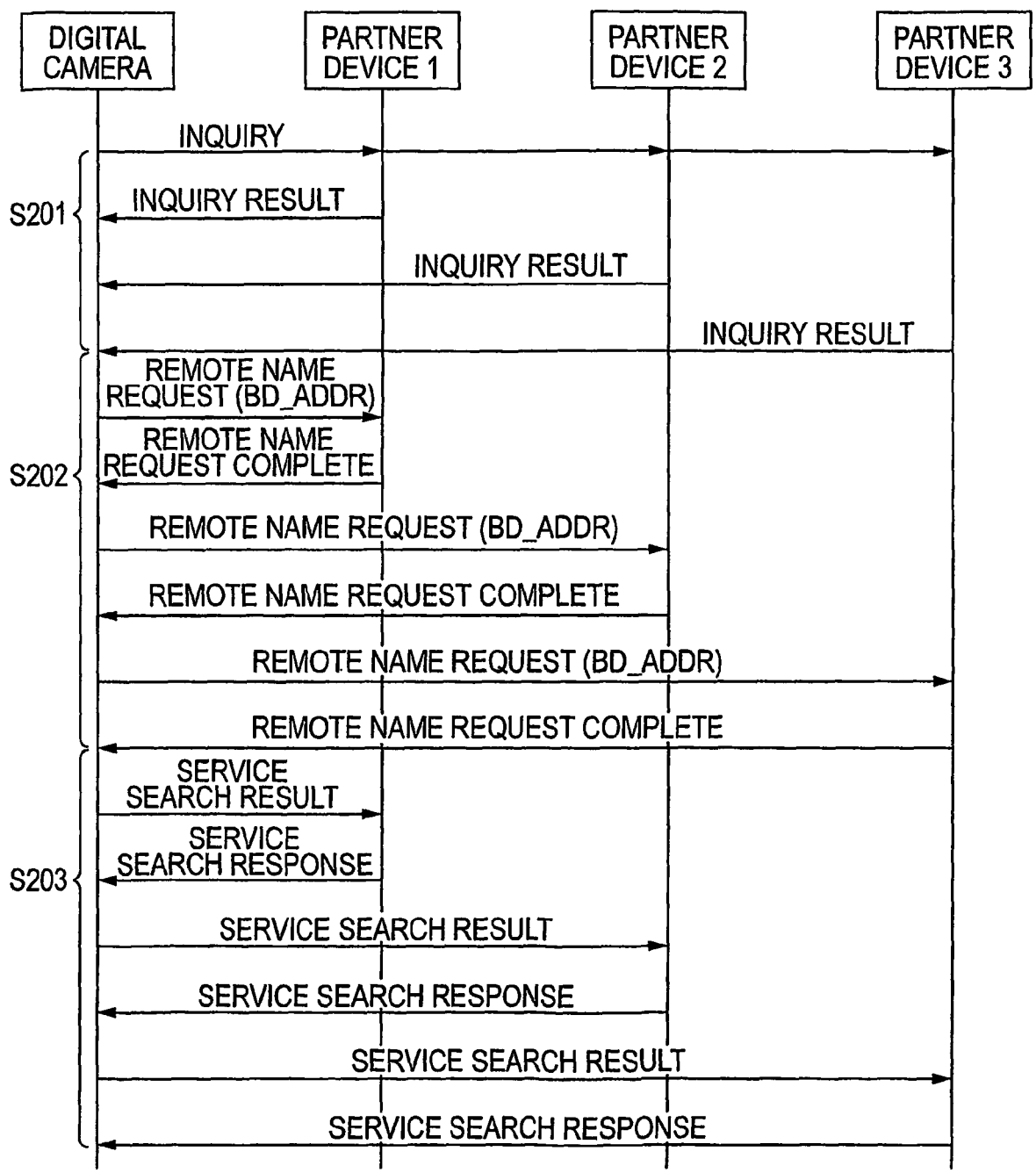
FIG. 4 is a flowchart illustrating the search process of peripheral partner devices.

Now, the search process of the partner device(s) will be described in detail. FIG. 4 is a flowchart illustrating the search process of the peripheral partner device(s) in accordance with the present embodiment. In the present embodiment, the Bluetooth is utilized for the communication, and a total of three peripheral partner devices exist, although it is not limited thereto.

First, when the search process is started, detection of the peripheral partner devices is carried out. The detection of the peripheral partner devices is carried out by performing "Inquiry" request to peripheral partner devices 1-3, as represented by Step S201 in FIG. 4 for example. When the peripheral partner devices 1-3 as devices utilizing the Bluetooth receive the Inquiry request from the digital camera according to the present embodiment, respectively, the peripheral partner devices 1-3 send "Inquiry Result" to the digital camera. The Inquiry Result includes, for example, BD_ADDR as an address unique to a Bluetooth device, and a device class such as PC, PDA, portable phone and printer. Then, the digital camera receives data sent from the peripheral partner devices 1-3 to obtain information on the BD_ADDR and the device class as illustrated in FIG. 5A for example. The data received from each of the peripheral devices 1-3 is stored in the digital camera, and a response by each of the peripheral partner devices 1-3 for the Inquiry made by the digital camera is waited by the digital camera for a certain period of time.

Thereafter, as represented by Step S202 in FIG. 4, the digital camera performs "Remote Name Request" as inquiry as to the name of device as represented by FIG. 5B for example to each of the BD_ADDRs obtained by the Inquiry Request, so as to obtain the name of each of the peripheral Bluetooth partner devices 1-3.

Next, as represented by Step S203 in FIG. 4, the digital camera performs "Service Search Request" as represented by FIG. 5C for example to obtain supporting service information of the peripheral Bluetooth partner devices 1-3. The supporting service here includes a dial-up connection profile (Dial-UP Networking Profile) and BIP (Basic Imaging Profile) for example. The obtained supporting service information or data thereon of each of the peripheral partner devices 1-3 is also stored in the digital camera.

Figures 6, 7:
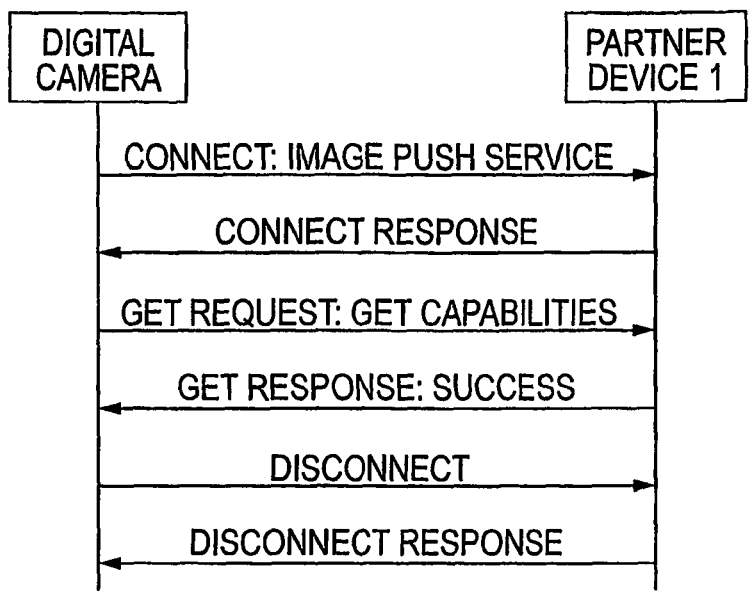
FIG. 6 is a flowchart illustrating procedures of acquiring detailed information of one of the found partner devices.
FIG. 7 illustrates the contents of the acquired detailed information of the found partner device.

FIG. 6 illustrates a procedure for obtaining detailed information of the peripheral partner devices found in this way described above. Here, the procedure illustrated in FIG. 6 is a procedure of "Get Capability" of the BIP.

First, the digital camera is connected with the predetermined partner device, i.e. the partner device 1 for example (Connect: Image Push Service). The partner device 1 connected with the digital camera then sends "Connect Response" to the digital camera. The digital camera then sends a partner device information acquiring command (GET Request: Get Capabilities) to obtain the detailed information of the partner device 1. When the digital camera obtains the detailed information of the partner device 1, the digital camera performs a disconnecting process. The detailed information of the partner device includes, for example, information as to a supporting encode type such as JPEG, GIF and so on, as to an accepting maximum file size, as to whether the partner device accepts DPOF (Digital Print Order Format), multi-printing and index-printing, although it is not limited thereto.

Figure 8:
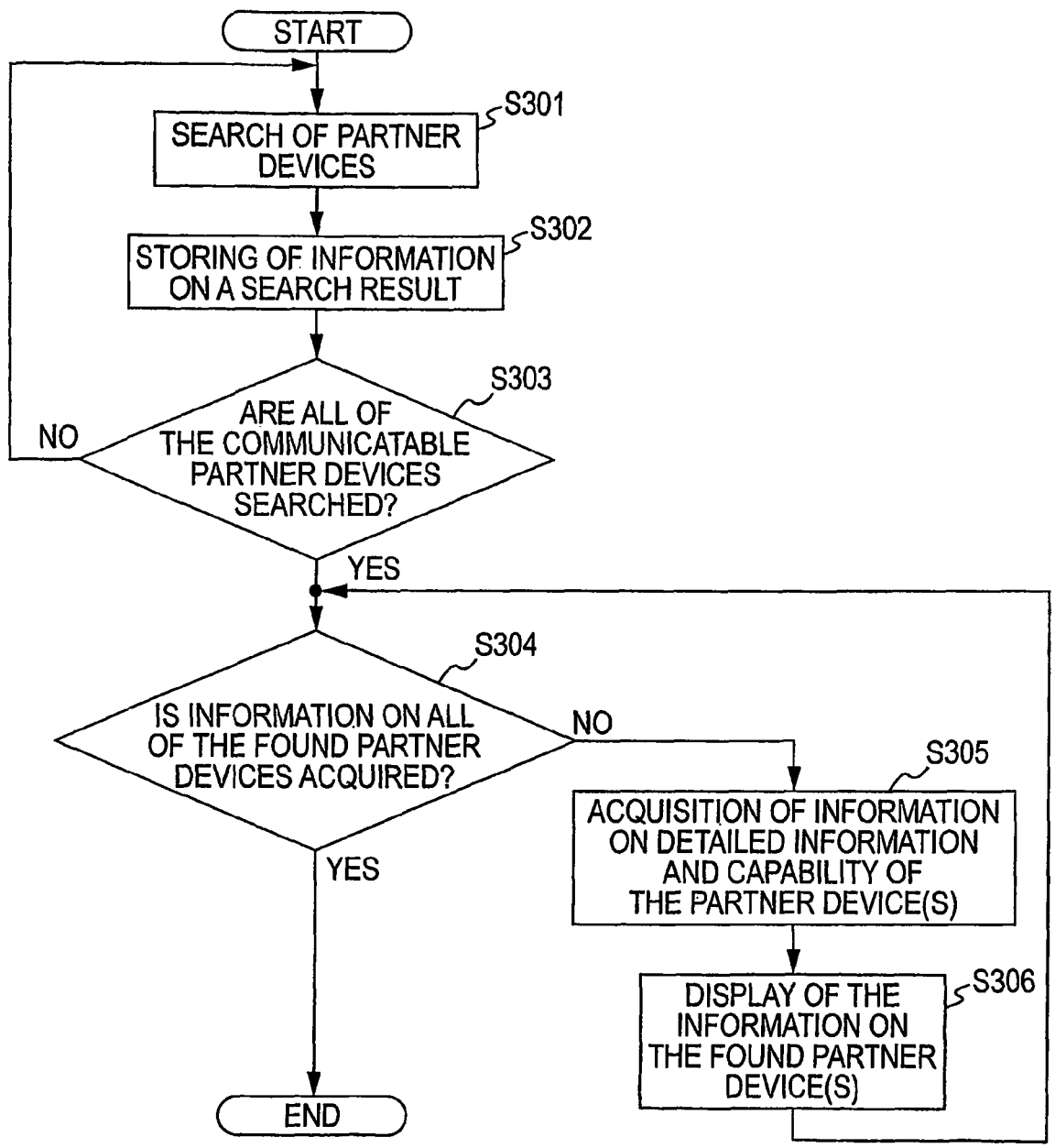
FIG. 8 is a flowchart illustrating the search process in the digital camera according to a preferred embodiment of the present invention.

FIG. 8 is a flowchart illustrating the search process in the digital camera according to a preferred embodiment of the present invention. Referring to FIG. 8, when the search process for the partner devices according to a flow of the search process described above is started, first, a search for the peripheral partner devices is carried out (Step S301). Then, a result of the search for the peripheral partner devices is stored (Step S302). Here, all of the partner devices communicatable are searched without acquiring the detailed information of the partner devices (Step S303: YES). In the present preferred embodiment, the wording "communicatable" or possible to communicate means by way of example to include a case in which the partner device has an interface same as that of the digital camera and has a same protocol as that of the digital camera for exchanging mutual information, physically.

Next, the detailed information of the partner device found is acquired or the detailed information on each of the partner devices found is acquired sequentially (Step S304: NO and Step S305). Then, information on the partner device or on each of the partner devices is displayed (Step S306). Here, the detailed information includes kinds of partner devices and supporting functions of the partner devices, and capability includes capability of each of the partner devices such as a printer (accepting kinds of papers, accepting sizes of papers for example) and so on. In one embodiment; the capabilities of the partner devices are not acquired at this point, and the capabilities are acquired when communication is actually performed.

Figure 9:
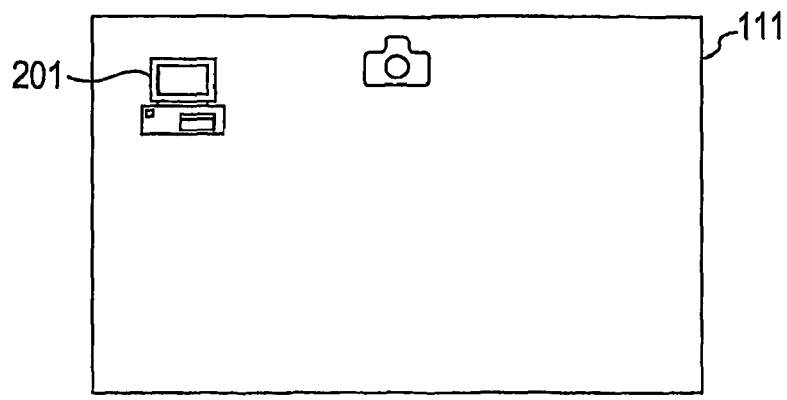
FIG. 9 illustrates an example of displaying of a search result in the digital camera according to the preferred embodiment of the present invention.

When all of the detailed information of the found partner device(s) are acquired, the search process is ended (Step S304: YES). In the present preferred embodiment, an icon 201 of the found partner device as illustrated in FIG. 9 for example is displayed on the LCD monitor 111 of FIGS. 1 and 2. FIG. 9 illustrates a case in which the icon 201 of the PC is displayed on a reproduction display screen, when the found partner device is the PC.

Figure 10:
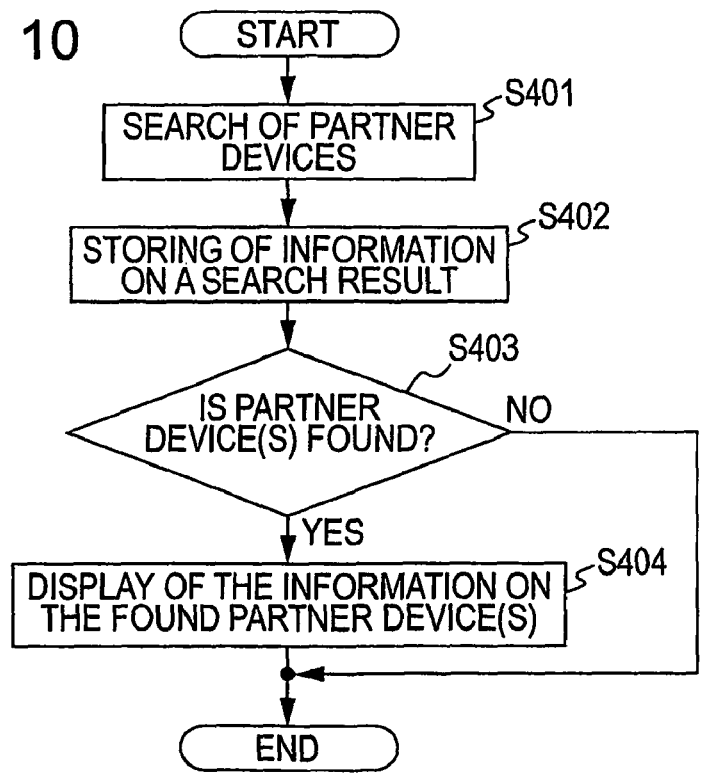
FIG. 10 is a flowchart illustrating another search process in the digital camera according to the preferred embodiment of the present invention.
Figure 11:
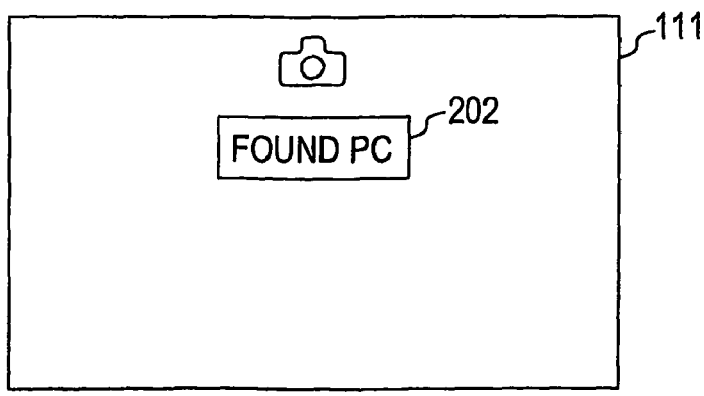
FIG. 11 illustrates another example of the displaying of the search result in the digital camera according to the preferred embodiment of the present invention.

FIG. 10 is a flowchart illustrating another search process in the digital camera according to the preferred embodiment of the present invention. Referring to FIG. 10, when the present search process for the partner devices according to the flow of the search process described above is started, first, a search for the peripheral partner devices is carried out (Step S401). Then, a result of the search for the peripheral partner devices is stored (Step S402). Thereafter, all of the partner devices communicatable are searched without acquiring the detailed information of the partner devices (Step S403). Then, when the partner device(s) is found (Step S403: YES), the found partner device(s) is displayed on the LCD monitor 111 of FIGS. 1 and 2 as a guidance information 202, for example, as illustrated in FIG. 11, which illustrates a display screen at the time when an image photographed by the digital camera is being reproduced (Step S404). The guidance information 202 includes for example a message displayed on the LCD monitor 111 which informs the user a fact or information that that the partner device(s) is found.

Figure 12:
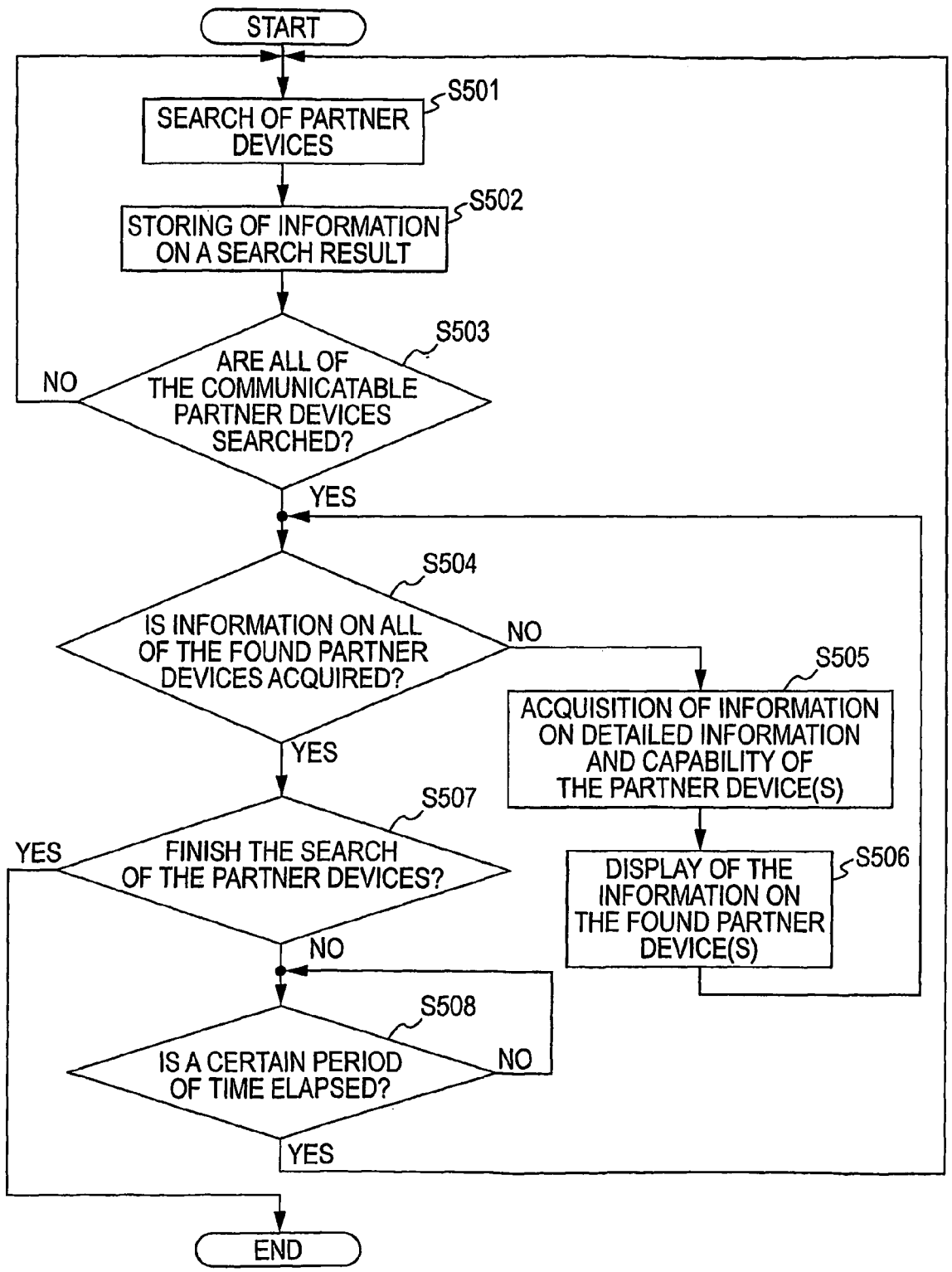
FIG. 12 is a flowchart illustrating yet another search process in the digital camera according to the preferred embodiment of the present invention.

FIG. 12 is a flowchart illustrating yet another search process in the digital camera according to the preferred embodiment of the present invention. Referring to FIG. 12, when the search process for the partner devices according to the flow of the search process described above is started, first, a search for the peripheral partner devices is carried out (Step S501). Then, a result of the search for the peripheral partner devices is stored (Step S502). Here, all of the partner devices communicatable are searched without acquiring the detailed information of the partner devices (Step S503: YES). In the present preferred embodiment, the wording "communicatable" or possible to communicate means by way of example to include a case in which the partner device has an interface same as that of the digital camera and has a same protocol as that of the digital camera for exchanging mutual information, physically.

Next, the detailed information of the partner device found is acquired or the detailed information on each of the partner devices found is acquired sequentially (Step S504: NO and Step S505). Then, information on the partner device or on each of the partner devices is displayed (Step S506). Here, the detailed information includes kinds of partner devices and supporting functions of the partner devices, and capability includes capability of each of the partner devices such as a printer (accepting kinds of papers, accepting sizes of papers for example) and so on. In one embodiment, the capabilities of the partner devices are not acquired at this point, and the capabilities are acquired when communication is actually performed.

Figure 13:
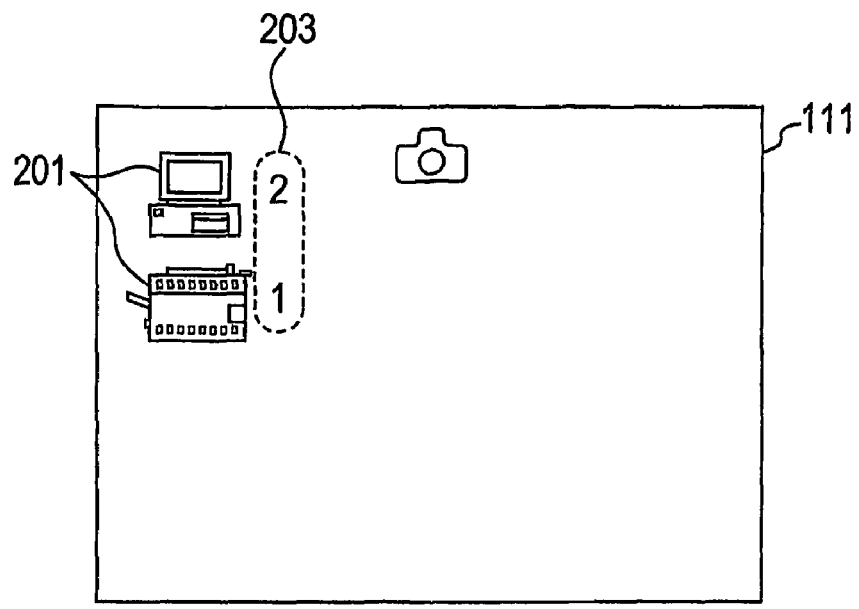
FIG. 13 illustrates yet another example of the displaying of the search result in the digital camera according to the preferred embodiment of the present invention.

When all of the detailed information of the found partner device(s) are acquired, whether or not there are instructions for ending of the search of the partner devices is judged, and the search process is ended when there are the instructions for ending of the search process (Step S504: YES and Step S507: YES). When there are no instructions of end for ending of the search process, a certain period of time, may be 30 seconds for example, is waited, and the search for the partner devices is carried out again (Step S507: NO, Step S508: YES, and Steps S501-S506). By doing so, it is possible to regularly search the peripheral partner devices, and to save power of the digital camera. After the detailed information of the found partner device(s) is acquired, the icon 201 representing the kind of partner device and a numeric character 203 representing the number of partner device(s) 203 found are displayed on the LCD monitor 111 as illustrated in FIG. 13. FIG. 13 illustrates a case in which, after the detailed information of one PC and one printer are acquired and displayed on the LCD monitor 111, two PCs and one printer are found when the partner devices found and to which the detailed information are acquired are the PCs and the printer.

Figure 14:
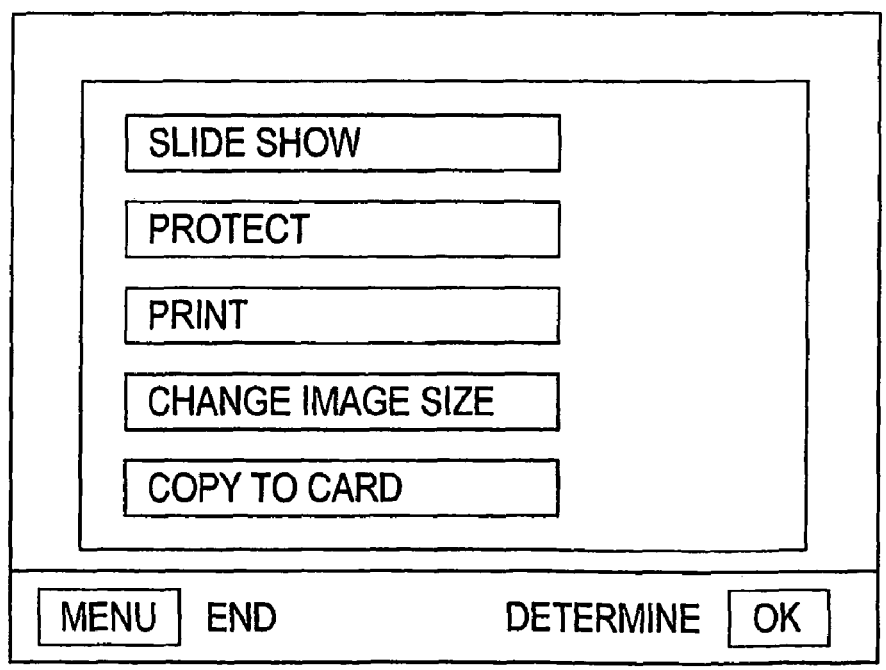
FIG. 14 illustrates a state in which a reproduction menu is displayed.

FIG. 14 illustrates a state in which a reproduction menu is displayed. In one embodiment of the invention, in a case in which the partner device(s) is found during when a screen in which no space is available for displaying the information on the found partner device(s) is being displayed as illustrated in FIG. 14 for example, the information on the found partner device(s) is not displayed until the state in which the reproduction menu is displayed is finished and, the screen of the LCD monitor 111 is returned to display the reproduction display screen as illustrated in FIG. 9 for example. Hence, according to the present embodiment, the information on the partner device(s) found during when the reproduction menu is being displayed is displayed when the state in which the reproduction menu is displayed is finished and, for example, the screen of the LCD monitor 111 transits to display the reproduction display screen. By way of example, when the state of the screen of the LCD monitor 111 transits to display the menu screen as illustrated in FIG. 14 with a circumstance in which one PC is found as illustrated in FIG. 15 and then another PC and printer are found while that menu screen illustrated in FIG. 14 for example is being displayed, the newly found PC and printer are not displayed at the time when they are found, and a fact or information that the two PCs and one printer are found is displayed on the LCD monitor 111 illustrated in FIGS. 1 and 2 as represented in FIG. 13 for example, at the time when the state of the screen of the LCD monitor 111 returns to the screen of FIG. 9 for example.

In the above described embodiments, all of the partner devices are searched as targets in the search process, although the embodiments are not limited thereto. The search for the partner devices may be carried out after the partner device(s) to be searched is specified. The specification of the partner device(s) may include the number of partner devices to be searched, kind of the partner device to be searched, and so on for example.

Figures 15, 16:
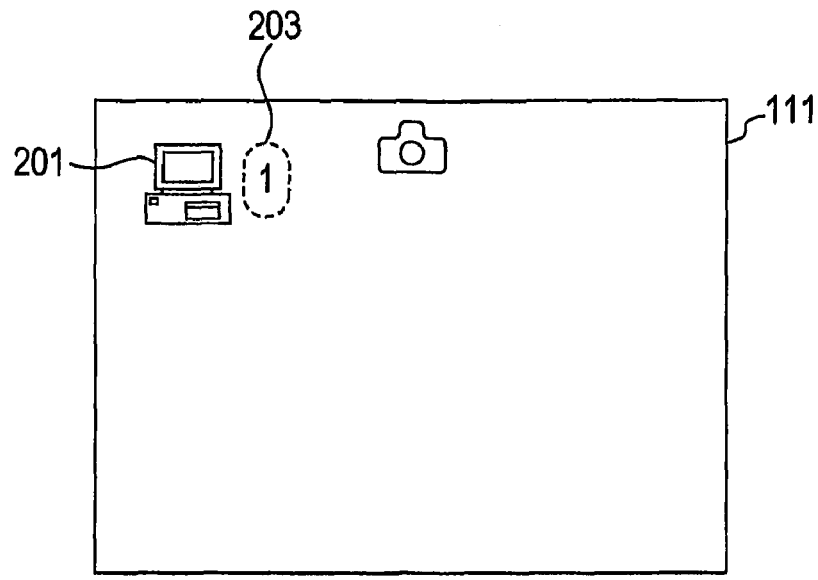
FIG. 15 illustrates still another example of the displaying of the search result in the digital camera according to the preferred embodiment of the present invention.
FIG. 16 illustrates a format of information of the partner device received when searching of the partner devices is performed according to the preferred embodiment of the present invention.

FIG. 16 illustrates a format of the information of the partner device received when searching of the partner devices is performed according to the preferred embodiment of the present invention. Data illustrated in FIG. 16 is the data acquired when the search for the partner devices is performed as illustrated in FIG. 4 for example.

Referring to FIG. 16, "Device Kind" is the information on the device class in the response to the "Inquiry" illustrated in FIG. 4, and "Device Name Character Code Type", and "Device Name Character Code" are the detailed information on the name of the partner device in the response to the "Remote Name Request" in FIG. 4. For example, when the information on the partner devices found in the search are received as illustrated in FIG. 17 for example, two kinds of information on the search result illustrated in FIG. 18 for example are displayed on the LCD monitor 111 illustrated in FIGS. 1 and 2.

Meanwhile, in FIGS. 17 and 18, "プリンタCX8000" is Japanese language characters representing "Printer CX8000", and "PC 保存用" is also Japanese language characters representing "PC_for storage". Note that those Japanese language characters each indicating name of the partner devices as the two kinds of information on the search result as described above are displayed on the LCD display 111, since the "Device Name Character Code Type" thereof are in "Shift_JIS", which is a character encoding for the Japanese language originally developed by Microsoft (Registered trademark) Corporation.

FIG. 19 illustrates another format of the information of the partner device received when the searching of the partner devices is performed according to the preferred embodiment of the present invention. In the present embodiment, it is possible to use two kinds of character codes as illustrated in FIG. 19.

For example, in a case in which a code that the digital camera can display is only in "US-ASCII" and the information on the partner device is as illustrated in FIG. 20, the digital camera is possible to display a character string in US-ASCII but cannot display a character string in "Shift_JIS". Thus, the character string displayed on the LCD monitor 111 is "PRINTER CX8000". When the codes that the digital camera can display are in US-ASCII and Shift_JIS and the information on the partner device is as illustrated in FIG. 20, the character string displayed on the LCD monitor 111 is "プリンタCX8000" (プリンタ: Japanese language characters meaning "printer"), since the digital camera is possible to display the character strings in US-ASCII as well as in Shift_JIS. In this case, the character string displayed on the LCD monitor 111 can be "PRINTER CX8000" instead of "プリンタCX8000" since both of the character strings in US-ASCII as well as in Shift_JIS are supported.

In addition, in a case in which the codes that the digital camera can display are in US-ASCII and a part of the Shift_JIS and the information on the partner device is as illustrated in FIG. 20, whether or not each of the characters of "プリンタCX8000" as the character strings in the Shift_JIS can be displayed may be confirmed. When the character "タ" is not available in the Shift_JIS and thus the digital camera cannot display the character "タ" of the characters "プリンタCX8000", the character string displayed is "PRINTER CX8000" in the US-ASCII. In addition, when all of the characters of "プリンタCX8000" are available in the Shift_JIS, the displayed character string is "プリンタCX8000" in the Shift_JIS since all of the characters "プリンタCX8000" are available.

Although various search processes in the digital camera according to the exemplary embodiments have been described above with reference to flowcharts, it is to be noted that these search processes may be combined unless any contradictions occur. For example, referring to FIG. 10, when the partner device(s) is found (Step S403: YES) and the guidance information 202 is displayed (Step S404), the acquired detailed information of the partner device(s) found may be then displayed, as in the Step 306 illustrated in FIG. 8. Here, the icon 201 representing the kind of partner device found may be displayed on the LCD monitor 111 as illustrated in FIG. 9, or the icon 201 representing the kind of partner device and the numeric character 203 representing the number of partner devices 203 found may be displayed on the LCD monitor 111 as illustrated in FIG. 13. The detailed information of the found partner device(s) may also be displayed on the LCD monitor 111 by utilizing the character codes such as US-ASCII and Shift_JIS as described above, although the character codes are not limited thereto.

Accordingly, digital camera according to the embodiments of the invention has at least the following advantageous.

(1) The digital camera according to the embodiments of the invention displays the fact or the information that the partner device(s) is searched and found when the partner device(s) communicatable with the digital camera is found. Therefore, it is possible to provide the digital camera in which the result of search is easy to understand and having the good operability in selection of the communication partner device(s).

(2) The information of the partner device(s) searched and found is displayed on the display when the communicatable partner device(s) is searched and found. Therefore, it is possible to provide the digital camera having the good operability.

(3) The number of the partner device(s) searched and found is displayed on the display. Therefore, it is possible to provide the digital camera which is user-friendly and having a superior operability.

(4) The result of the search is displayed on the display when an operation in which the result of the search is possible to be displayed on the display is carried out. Thus, it is possible to understand a status of the search of the partner device(s) when the state of the operation transits from the operation in which the result of the search cannot be displayed on the display to the operation in which the result of the search is possible to be displayed on the display. Therefore, it is possible to improve the operability.

(5) The partner device(s) to be searched is possible to be specified. Therefore, it is possible to search only the desired partner device(s).

(6) The result of the search is displayed by the character string. Thus, the result of the search becomes easy to understand. Therefore, it is possible to provide the digital camera having the superior operability.

(7) The kind of character code of the character string obtained by the partner device(s) is judged to display the character string of the kind of character code displayable on the display. Thus, it is possible to display the information on the partner device(s) found even when, at least, there are few supported display characters available. Therefore, the result of the search becomes easy to understand, and it is possible to provide the digital camera having the superior operability.

Therefore, since the fact or the information that the partner device(s) is searched and found is displayed when the partner device(s) communicatable with the digital camera is found, it is possible to provide the digital camera in which the result of search is easy to understand and having the good operability in selection of the communication partner device(s).

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present description or during the prosecution of the application, which examples are to be construed as non-exclusive. For example, in the present disclosure, the term "preferably", "preferred" or the like is non-exclusive and means "preferably", but not limited to.

The present application is based on and claims priority from Japanese Patent Application Serial Number 2006-032061, filed Feb. 9, 2006, the disclosure of which is hereby incorporated by reference herein in its entirety.

The invention claimed is:

1. A digital camera, comprising:
an imaging unit configured to image an image of a photographic subject and output the imaged image of the photographic subject as an image data;
a recording unit configured to store the image data outputted from the imaging unit as an image file;
a communicator configured to establish communication with at least one external device to transmit data with the at least one external device;
a display configured to display the image of the photographic subject imaged by the imaging unit and the image data stored in the recording unit as a reproduced image; and
a controller configured to search the at least one external device possible to communicate with the communicator by the communicator, and configured to display a character string corresponding to a character code indicating name of the at least one external device searched and found obtained by the communication with the at least one external device by the communicator on the display, when the at least one external device is searched and found,
wherein the controller is further configured to judge a kind of the character code of the character string obtained by the communication with the at least one external device by the communicator as to whether or not the digital camera supports the kind of the character code obtained, based on an information on the kind of the character code obtained by the communication, and to display the character string of the character code corresponding to the kind of the character code supported on the display.

2. The digital camera according to claim 1, wherein the character string obtained by the communication with the at least one external device by the communicator includes a first character string and a second character string, the controller is further configured to judge a first kind of the character code corresponding to the first character string and a second kind of the character code corresponding to the second character string obtained by the communication with the at least one external device by the communicator as to whether or not the digital camera supports the first kind of the character code and the second kind of the character code obtained, based on an information on the first kind of the character code and second kind of the character code obtained by the communication, to display the first character string on the display when the corresponding first kind of the character code is supported, and to display the second character string on the display when the corresponding second kind of the character code is supported.

3. The digital camera according to claim 2, wherein the controller is further configured to display the first character string on the display when both of the corresponding first and the second character strings are supported.

4. The digital camera according to claim 2, wherein when the digital camera does not support a part of the character string of one of the first character string corresponding to the first kind of the character code and the second character string corresponding to the second kind of the character code, the controller is configured to display the character string of the other of the first character string and the second character string fully supported by the digital camera.

* * * * *